ated Apr. 23, 1957

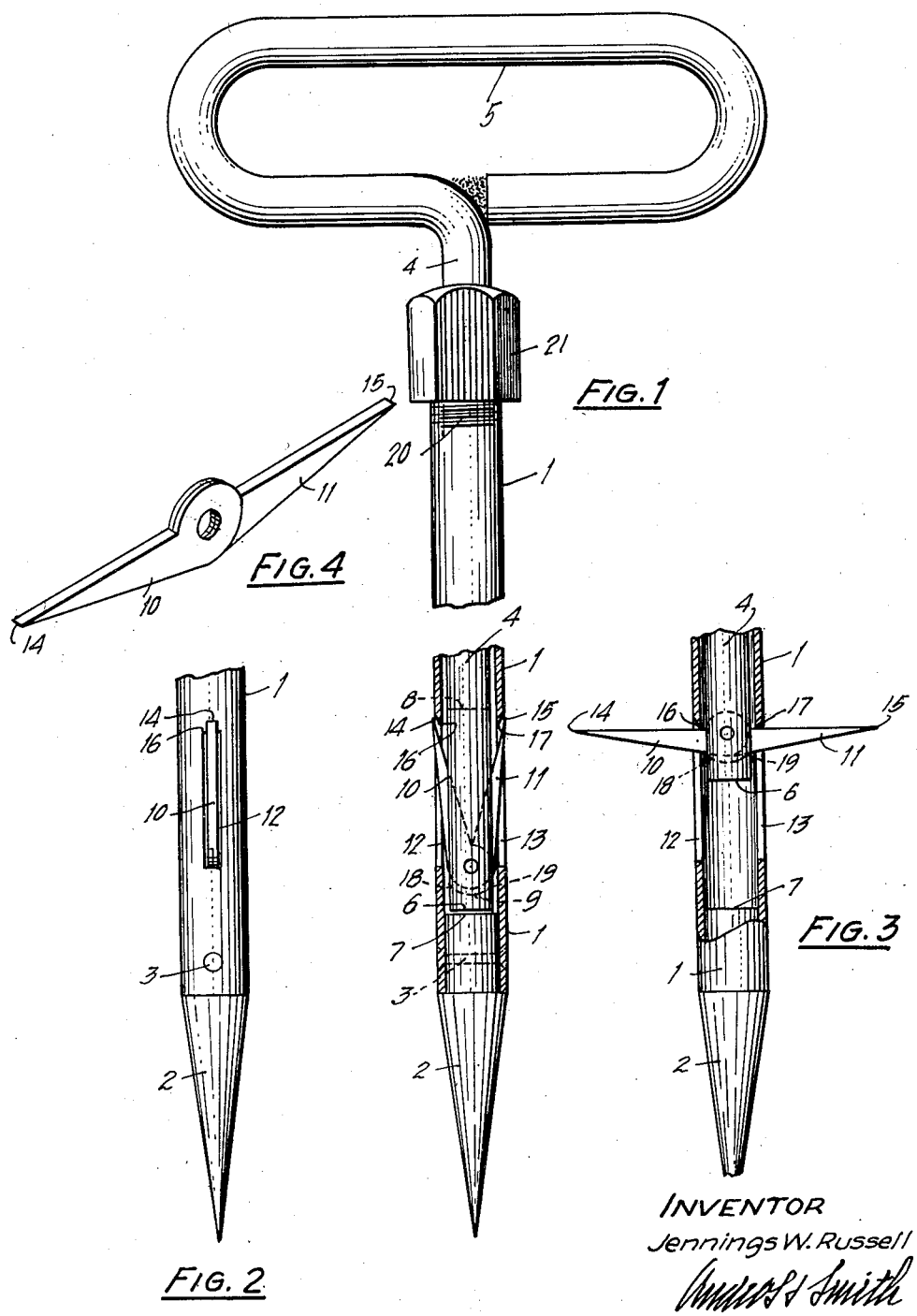

2,789,856
GAFF
Jennings W. Russell, Bombay, N. Y.

Application June 24, 1955, Serial No. 517,718

2 Claims. (Cl. 294—61)

My invention relates to gaffs of the type which are used in fishing.

The principal object of my invention is to provide a gaff of simple construction which may be readily thrust into a large fish and which will automatically lock itself within the fish so that it cannot be withdrawn therefrom and the fish cannot release itself as long as there is some tension on the gaff. More specifically, the principal object of my invention is to provide a gaff having a pair of sharp teeth normally disposed within it so that they will not prevent the thrusting of said gaff into a large fish, but which, when within the fish and the gaff is pulled, will automatically be projected laterally from the gaff into the flesh of the fish so that the fish and the gaff are locked together.

I accomplish these objects in the manner described below and illustrated in the accompanying drawing, in which—

Fig. 1 is an elevation view of my gaff, partially in section, and portions omitted;

Fig. 2 is a side view of the pointed end of the gaff and a portion closely adjacent thereto;

Fig. 3 is a section of the lower portion of the gaff showing the teeth in the position which they will assume when the gaff is locked to the fish; and Fig. 4 is a perspective view of the teeth in the position which will prevent the withdrawal of the gaff from the fish or the release of the fish therefrom.

Referring to the drawing, my gaff is an elongated, attenuated element comprising a tube 1 which may be of copper having the closure element 21 at the top thereof and to which is secured, at the lower end, a sharp pointed element 2, preferably of steel and which may be soldered, welded, or otherwise secured to the tube 1, as by a rivet 3. Slidably mounted in the tube 1 and extending through said closure element is a rod 4, preferably of aluminum, having a handle or grip 5 at the top thereof, and the lower end 6 of which is normally in contact with the inner end 7 of the element 2. At its lower end the rod 4 has a transversely extended slot therein, the top of which is indicated by the dotted line 8 in Fig. 1 and the bottom by the dotted line 9. Pivotally mounted in the slot, near the bottom thereof, is a pair of sharp pointed teeth 10 and 11 so that they may swing outwardly and downwardly from the position shown in Figs. 1 and 2 to the position shown in Fig. 3. In transverse alignment with the slot in the rod are slots 12 and 13 in the tube 1 for the passage of the teeth therethrough.

When the rod 4 is pushed into the tube 1 so that its bottom is in contact with the top of the pointed element 2, the teeth are normally substantially within the rod 4 but their free, pointed ends 14 and 15 project into slots 12 and 13 and extend outwardly beyond the tops 16 and 17 of said slots. Thus when the rod 4 is pulled upwardly by means of the handle 5, the teeth will contact the tops of the slots 12 and 13 and swing downwardly and outwardly from the gaff into the position shown in Fig. 3. The downward swinging movement of the teeth is limited by their contact with the bottom edges 18 and 19 of the slots in the rod 4.

Preferably, the free ends of the teeth project far enough beyond the outer surface of the tube 1 so that, when they are within a fish and the rod 4 is moved upwardly in the tube, they will engage the flesh of the fish and thus be swung downwardly and outwardly and forced into said flesh.

While I have described my invention in its preferred embodiment it is to be understood that the words which I have used are words of description and illustration rather than words of limitation and that changes within the purview of the appended claims may be made without departing from the true scope and spirit of my invention in its broader aspects.

What I claim is:

1. In a gaff, the combination with an elongated element sharply pointed at one end and provided at the top with a handle, whereby it may be thrust into a fish; of a pair of sharp pointed teeth pivotally connected to said gaff and normally substantially within said elongated element in a zone adjacent the pointed end thereof but adapted to swing outwardly and downwardly from opposite sides thereof into positions substantially at right angles thereto; the free ends of said teeth projecting slightly from opposite sides of said elongated element; whereby, when said gaff is thrust into a fish and said handle is pulled, said teeth will engage the flesh of said fish and be forced into said flesh until they are disposed substantially at right angles to said elongated element and prevent its withdrawal from the fish.

2. A gaff comprising an elongated tubular element having a sharp point at one end thereof and provided with two oppositely disposed slots adjacent said pointed end; a rod slidably mounted in said tubular element and having a handle on the outer end thereof; said rod having a pair of sharp pointed teeth pivotally mounted thereon adjacent the inner end thereof to swing in opposite directions from a position substantially within said tubular element through said slots to a position outstanding therefrom; said teeth having their pointed ends normally projecting slightly outwardly from said slots at the upper ends thereof whereby, when said gaff is thrust into a fish beyond said pointed ends and said handle is then pulled, said teeth will contact the upper ends of said slots and swing outwardly through said slots into the flesh of the fish.

References Cited in the file of this patent

UNITED STATES PATENTS

| 524,035 | White | Aug. 7, 1894 |
| 1,113,465 | Moller | Oct. 13, 1914 |

FOREIGN PATENTS

| 875,178 | France | June 8, 1942 |